May 29, 1962 J. D. JONES ETAL 3,036,765

INDUSTRIAL CARD READER

Filed July 2, 1959 2 Sheets-Sheet 1

INVENTORS.
J. D. JONES ~AND~
BY R. W. KETTLETY.

Howard M. Dustin

INDUSTRIAL CARD READER

Filed July 2, 1959 2 Sheets-Sheet 2

INVENTORS.
J. D. JONES AND
BY R. W. KETTLETY.
Howard M. Dunten

United States Patent Office 3,036,765
Patented May 29, 1962

3,036,765

INDUSTRIAL CARD READER

Jack D. Jones and Robert W. Kettlety, Phoenix, Ariz., assignors to General Electric Company, a corporation of New York Filed July 2, 1959, Ser. No. 824,668
3 Claims. (Cl. 235—61.11)

This invention relates generally to an apparatus for sensing information in record-bearing media and more particularly to an improved photoelectric apparatus for sensing rows of apertures or of discrete light-transmitting areas in a record medium.

Industry has a need for an inexpensive yet reliable and flexible method of storing a variety of production or process control programs for automatically controlled machinery from which a selection may be made for a specific order as, for example, in filling a particular order in a steel-rolling mill. Punched cards are well suited for that purpose because a particular card may be visually selected by an operator and read by a suitable reader to provide digital control signals for the machinery.

In order to be able to store a large variety of control programs in punched cards, the card reader to be used must be as flexible as the system for storing the programs. For example, a standard card having twelve rows and eighty columns of aperture positions may be used to store either twelve words having eighty characters each or twenty-four words having forty characters each, or any other number of words, by dividing some or all of the rows into equal sections of aperture positions. Accordingly, the card reader must be capable of selectively reading a given row not only in its entirety but also in sections. For some applications the card reader must also be capable of reading continuously all or part of a given row to provide fixed data while reading the remaining rows selectively.

In an application, Serial No. 824,502, filed concurrently herewith by Maurice W. Cannon and assigned to the assignee of the instant application, a reliable card reader is disclosed that does not have moving parts which are apt to malfunction due to dust, grease or oil and which is flexible in that it may be used to read the rows in a card individually in any desired sequence. In that reader there is provided a light-source assembly having a plurality of selectively operable light source that individually distribute light on corresponding rows. Light passing through an aperture in any given column or an individual row falls on a photoelectric cell associated with that column to provide a digital signal at a corresponding output line. Blocks of solid light-transmitting material, such as Lucite or quartz, are provided to guide light from a given light source to a corresponding row of apertures and to guide light passing through apertures in that row to associated cells. Those blocks function not only to guide light to particular rows and cells but also to shield those rows and cells from stray light.

The present invention is an improvement over that photoelectric card reader in that greater flexibility is provided without sacrificing reliability.

An object of this invention is to provide an improved photoelectric card reader that is not only reliable but also flexible, inexpensive and easy to maintain.

Another object is to provide a photoelectric card reader for continuously reading part of a single row while selectively reading other rows.

Another object is to provide a card reader for continuously reading selected columns of one row while selectively reading other columns of that row.

Still another object is to provide a gas-filled lamp which may be energized in sections to selectively radiate light from all or part of its length and thereby selectively illuminate all or part of a row.

These and other objects are realized in one embodiment of this invention by providing, in an apparatus for reading a card having a plurality of rows and columns of aperture positions, a light-source assembly with a plurality of elongated light sources each having a pair of baffles which channel light to a corresponding row of aperture positions in the card. One light source may be selectively energized in sections in order to illuminate its corresponding row in sections. A light-collector assembly is provided having a plurality of photoelectric cells, one for each column of aperture positions, and a plurality of baffles arranged to channel light passing through columnar apertures in a selected row to associated photoelectric cells. Light passing through a given aperture into a given columnar light-collector channel is sensed by its associated cell. Another group of photoelectric cells is provided to sense light passing through columnar aperture positions in a certain section of a particular row. Rods of Lucite, quartz or other similar solid light-transmitting material serve to guide light passing through those apertures to associated cells in the second group and to shield them from stray light or light passing through apertures in other rows of the same columns. Amplifiers, selectively operable in sections, detect the photoelectric effect of light on the cells and produce digital signals at corresponding output terminals.

Other objects and advantages of the invention will appear from the following description with reference to the drawings in which.

Figure 4:
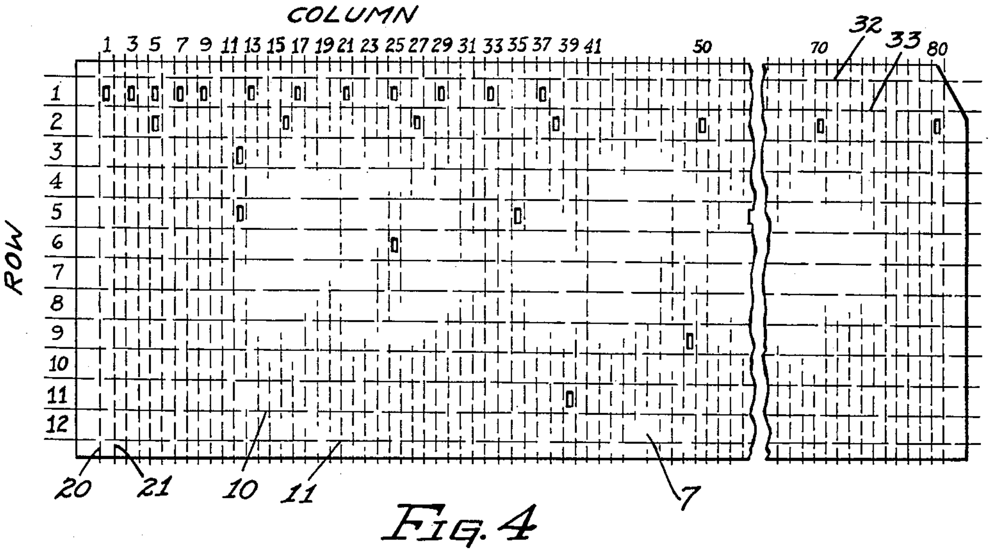

FIG. 4 schematically shows by a grid of broken and dotted lines how the rows and columns of aperture positions in a standard punched card are divided into a matrix by baffles in accordance with this invention.

Figure 5:
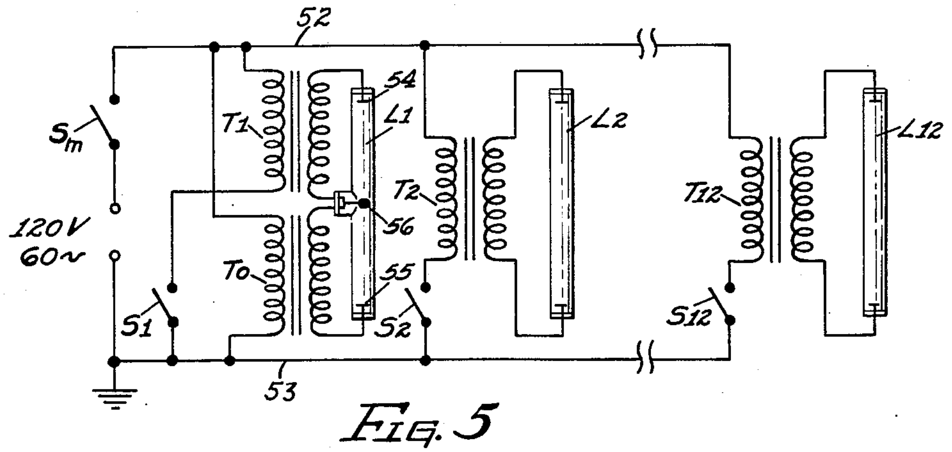

FIG. 5 schematically shows an electrical system for individually energizing the light sources of the apparatus.

Figure 6:
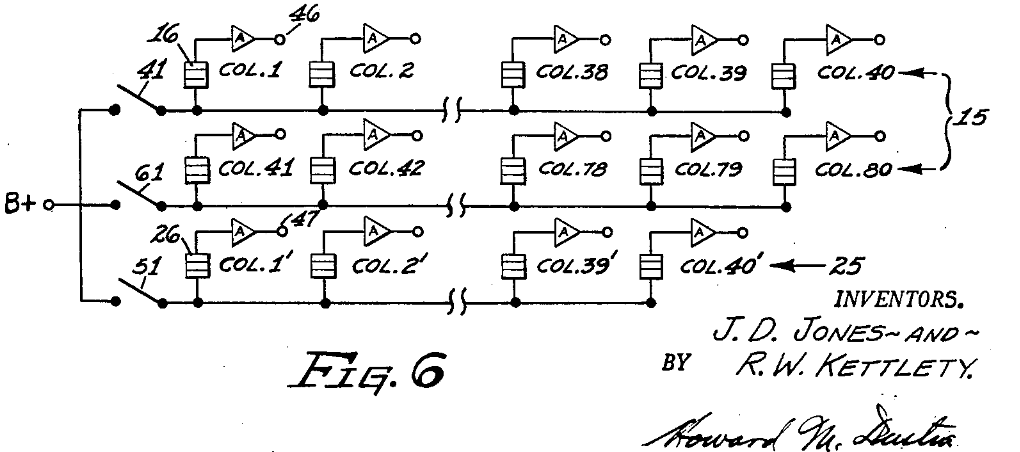

FIG. 6 schematically shows the amplifier assembly of the apparatus.

Figure 1:
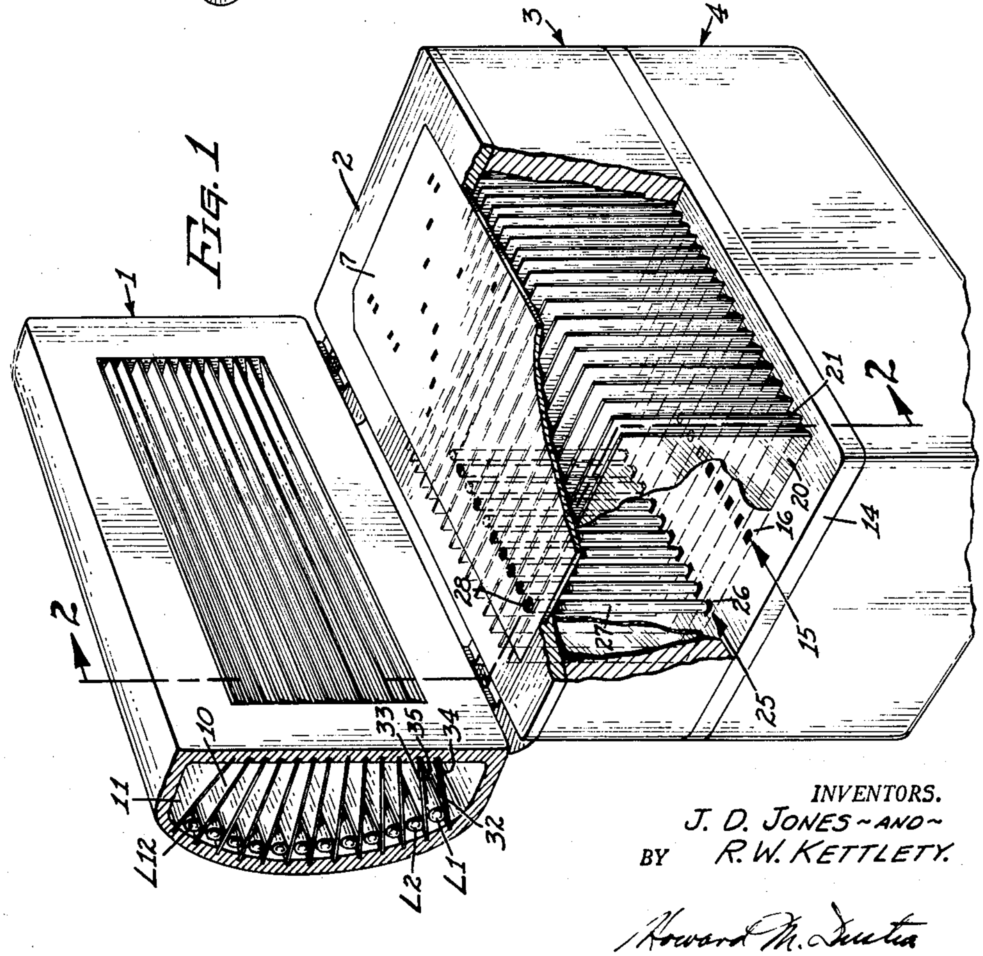
FIG. 1 is a perspective view, partly in section and partly broken away, of an apparatus constructed in accordance with this invention.

Referring to FIG. 1 of the drawings, a perspective view is shown of an embodiment of this invention. It consists of a light-source assembly 1, a record holder 2, a light-collector assembly 3 and an amplifier assembly 4. These components are mounted in a housing consisting of a box with a lid as illustrated so that the light-source assembly 1 may be moved away from the light-collector assembly 3 in order to gain access to the record holder 2. However, a housing of any other design may be provided for these assemblies as long as it is possible to gain access to the record holder 2. For example, the lid may be fastened to the box in a closed position and provision made for sliding the record holder 2 in and out.

The record medium 7 is illustrated as a standard punched card having a plurality of rows and columns of apertures or holes. However, it should be understood that for the purposes of this invention the record may be any opaque sheet or film having discrete light-transmitting areas arranged in rows and columns.

The light-source assembly 1 consists of individually operable elongated neon lamps $L_1$ to $L_{12}$ arranged in parallel so that their axes are parallel to the rows of holes in the card 7 in a manner to be more fully explained with reference to FIG. 2. Each of these neon lamps, such as the lamp $L_{12}$, corresponds to a particular row. A pair of baffles of opaque shields or plates is provided for each neon lamp to channel the light from each lamp to its corresponding row such as the baffles 10 and 11 for lamp $L_{12}$.

The light-collector assembly 3 consists of a compartment on the top of which the record holder 2 and the card 7 are placed. Within the compartment, on a phenolic plate 14 opposite the record holder 2, there is a first group of photoelectric cells 15 (FIG. 1) arranged in a row parallel to the rows of holes in the card 7. The group 15 includes one cell for each column of hole positions in the card 7 and each one of those cells, such as the cell 16, is placed directly below the center of its corresponding column of holes. Light baffles of opaque sheets or plates, such as the plates 20 and 21, divide the compartment into channels, each channel containing one of the photoelectric cells 15 and a column of holes such as the hole 22 (FIG. 2). These baffles extend from the phenolic plate 14 of the compartment to the card 7, each lying in a plane defined by a first line parallel and adjacent to a given column of holes and a second line which is parallel to the first and adjacent to a cell associated with that column. In that manner, light passing through a given columnar hole, such as a hole 22 shown in FIG. 2, is confined to one of the channels into which the light-collector compartment is divided and each channel encloses one of the cells of the first group of photoelectric cells 15 so that a given cell, such as the cell 16, receives light only from a hole in its corresponding column of holes, such as the hole 22.

The light-collector assembly 3 also includes a second group of photoelectric cells 25 arranged in a row on the phenolic plate 14. Each of these cells, such as the cell 26, is contained within one of the channels of the light-collector assembly established by the baffles, such as the baffles 20 and 21, and is placed directly below a corresponding columnar hole 28 in the first row. This hole 28 is luminously connected to the photoelectric cell 26 by a rod of Lucite, quartz or other similar light-transmitting material, such as the rod 27. That rod not only guides light from the columnar hole 28 to the corresponding cell 26 but also shields the cell from light passing through holes in other rows of the same column. In the illustrated embodiment, cells are provided in the second group 25 only for the first half of the first row.

Figure 2:
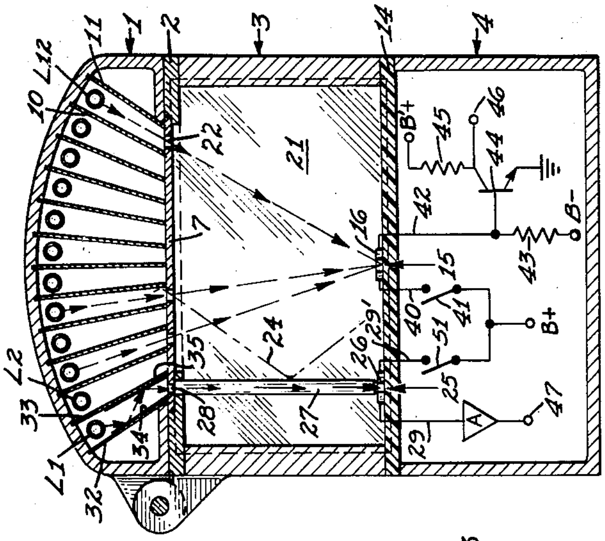
FIG. 2 is a sectional elevation taken on the line 2—2 of FIG. 1.
Figure 3:
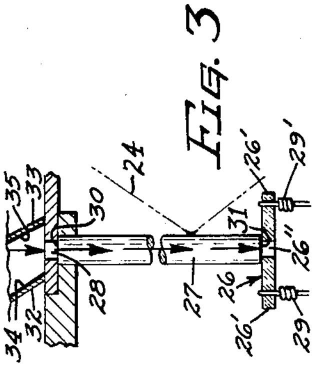
FIG. 3 is an enlarged view of a portion of the apparatus as shown in FIG. 2.

By referring to FIGS. 2 and 3, the relationship of these elements may be more clearly understood. FIG. 2 shows a vertical cross section of the apparatus taken on the line 2—2 of FIG. 1 with the lid closed. There it can be seen that the neon lamps in the light-source assembly 1 are located on an arc about the photoelectric cells 15 and that the baffles are radially arranged around the cells 15 to channel light from the lamps to the corresponding rows of holes in the card 7. A hole in a given column of a selected row, such as the hole 22 in the first column of the twelfth row, is illuminated by light from the corresponding lamp $L_{12}$. Light passing through that hole falls directly upon the associated cell 16. In that manner, the cells in the first group 15 are employed to sense the presence of punched holes in each column of all the individual rows except the first half of the first row.

The cells in the second group 25 are employed to sense the presence of punched holes in the fisrt half of the columns of the first row. For example, the cell 26 receives light through the rod 27 from the hole 28 in the first column. In that manner the first half of the columns in the first row may be read continuously by energizing the first half of the neon lamp $L_1$ while other rows and the second half of the columns of the first row are being read selectively by energizing other neon lamps and the second half of the neon lamp $L_1$ as will be more fully described presently.

Rod 27 shields its associated cell 26 from stray light by covering it, as may be more clearly seen in FIG. 3. Stray light that falls on the surface boundary of the rod 27 is substantially reflected away from the cell 26 is illustrated by a single ray 24 of stray light in FIGS. 2 and 3. Direct light passing through the hole 28, on the other hand, is guided to the cell 26. The use of rods made of Lucite, quartz or other similar solid light-transmitting material as light guides is quite common. Light that enters one end is reflected by the tubular surface boundary of the rod so that substantially all of it is transmitted out of the other end.

The cells, such as the cell 26, may be of the cadmium selenide photoconductive type having both ends 26′ covered with tinned indium so that only a small photosensitive area 26″, which may be covered by the rod 27, is exposed and so that electrical conductors or leads 29 and 29′ may be connected to it as shown in FIG. 3.

Since there is not a straight line path through the light-source channel of the lamp $L_1$ and the rods, such as the rod 27, much of the light from the lamp $L_1$ is incident to the surface 30 of the rod at an angle so that there may be too much undesired reflection. To minimize that undesired reflection, the baffles 32 and 33 which form the channel for the lamp $L_1$ are lined with reflectors 34 and 35 along the first half of their lengths. Those reflectors serve to change the direction of the light rays so that the total light perpendicularly incident to the surface 30 is maximized, thereby maximizing the total light transmitted into the rod and out to the cell 26 through a surface 31 at the other end of the rod.

FIG. 2 shows the manner in which each cell, such as the cell 16, is connected to an amplifier circuit in the amplifier assembly 4. A lead 40 passing through the phenolic plate 14 connects one end of the cell 16 to a source of positive direct voltage B+ through a switch 41. A second lead 42 passing through the phenolic plate 14 connects the other end of the cell 16 to a source of negative direct voltage B− through a resistor 43. The impedances of the cell 16 and of the resistor 43 are so proportioned that, when the cell 16 is in the dark, the cell and the resistor form a voltage divider which provides a bias voltage that is at or slightly below ground. An NPN transistor 44 is provided having its emitter connected to ground and its collector connected to a second source of positive direct voltage B′+ through a resistor 45. The transistor 44 is normally held below cutoff by the bias voltage at the junction between the cell 16 and the resistor 43 to which the base of the transistor is connected.

In operation, light falling on the cell 16 reduces the impedance of the cell due to the photoelectric effect of the light on the cell, thereby reducing the ratio of the cell 16 impedance to the resistor 43 impedance and raising the potential at the base of the transistor 44 to render is conductive. A substantial current then flows through the resistor 45 to produce a drop in potential at an output terminal 46 to which the collector of the transistor is connected. Since light will fall on the cell 16 only when a hole is being illuminated in its associated column of hole positions, such as the hole 22 which is illuminated by the lamp $L_{12}$ that corresponds with the twelfth row, a drop in potential at the output terminal 46 indicates the presence of a recorded bit "one" in the first column of the twelfth row.

Illumination of the cell 26 similarly produces a bit "one" signal at an output terminal 47 when a control switch 51 is closed. Since the cells 16 and 26 are illuminated separately, the first row may be sensed continuously in the first column while the remaining rows can be sensed selectively in the first column. Similarly, other columns in the first half of the first row may be sensed continuously while the corresponding columns in the remaining rows can be sensed selectively.

For convenience, an embodiment of the instant invention has been illustrated in FIG. 1 as a reader for a record card 7 having twelve rows and twenty columns in which the first row may be read continuously in half of the columns while the remaining half of the columns and the remaining rows may be read selectively. However, as indicated hereinbefore, this invention may be embodied in an apparatus for reading records having any number of columns and rows such as a record having twelve rows and eighty columns.

The record illustrated in FIG. 4 is a punched card having twelve rows and eighty columns of hole positions. A grid of horizontal broken lines and vertical dotted lines has been superimposed on the card to demonstrate how the light-source baffles, represented by the horizontal broken lines, and the light-collector baffles, represented by the vertical dotted lines, optically divide the card into a matrix of rows and columns. If the area between any pair of horizontal broken lines is filled with light, the holes present in that row may be detected by sensing the light passing through them and between the vertical dotted lines which optically define the columns. In that manner, any given hole position may be photoelectrically examined.

It can be readily appreciated from the foregoing description of FIG. 4 that any given row may be examined in sections, either by simply illuminating that row in sections or by illuminating the entire row and detecting the presence of light on the columnar cells in sections. Both of these techniques are combined in this invention to provide a versatile yet reliable card reader.

FIG. 5 shows schematically the manner in which the first row may be illuminated in sections so that the first half of that row may be read continuously while the second half of the first row and the remaining rows may be read selectively. A master switch $S_m$ connects a conventional source of alternating current, such as 120 volts at 60 cycles, to a line 52 having connected to it one terminal of each of thirteen primary windings of step-up transformers $T_0$ to $T_{12}$. The first transformer $T_0$ has the other terminal of its primary winding directly connected to a return line 53 which is connected to ground. The remaining transformers $T_1$ to $T_{12}$ have their other primary winding terminals connected to the return line 53 through respective separate control switches $S_1$ to $S_{12}$.

The secondary winding of each transformer is connected directly across one of the neon lamps $L_1$ to $L_{12}$, all of which are the same except the lamp $L_1$. That lamp, which is T-shaped, has electrodes 54 and 55 at each end and a common electrode 56 in the center which divides the lamp electrically into a first and second section. The transformer $T_0$ is connected across the first section so that upon closing the switch $S_m$, the first half of the lamp $L_1$ will glow to illuminate the first half of the first row of the record to be read. The second section of the lamp $L_1$ is connected across the transformer $T_1$ which may be energized by the control switch $S_1$ to separately illuminate the second half of the first row of the record. Consequently, all of the rows of the record illustrated in FIG. 4, except the first, are individually illuminated in their entirety.

FIG. 6 shows schematically the manner in which the photoelectric cells are energized in sections. In order to be able to read information that is recorded in sections, for example in sections of forty columns each, while the rows are illuminated in their entirety, the first group of photoelectric cells 15 are electrically connected in two sections of forty cells each. The second group of cells 25, which are associated only with the first half of the first row, are electrically connected as a separate section of forty cells. By energizing those sections of cells through three separate switches 41, 51 and 61, any section of a given row may be photoelectrically examined. The switch 41, which energizes the cell 16 as described with reference to FIG. 2, also energizes the remaining cells in the first section of forty cells of the first group of cells 15. The switch 51, which energizes the cell 26 as described with reference to FIG. 2, also energizes the remaining cells in the third section of forty cells which constitute the second group of cells 25. The third switch 61 is provided to selectively energize the second section of forty cells of the first group of cells 15.

In operation, the record selected to be read is placed in the holder 2 and the light-source assembly 1 is closed over it, after which the master switch $S_m$ is closed, thereby illuminating the first half of the first row. The switch 51 is then closed to energize the second group of cells 25, thereby obtaining binary bit signals from columns 1′ to 40′. Those signals may be used to identify the card, to check proper alignment or insertion, to provide fixed data for the user's equipment or even to program the order in which the remaining rows are to be read. The second half of the first row may be selectively read by closing the switches $S_1$ and 61. While reading the second half of the first row, the switch 41 may also be closed without producing false signals in columns 1 to 40. If the remaining rows are to be read in their entirety, both switches 41 and 61 are closed while the switches $S_2$ to $S_{12}$ are closed alternately. However, if the remaining rows are to be read in sections while they are being illuminated in their entirety, either the switch 41 or the switch 61 is closed depending on whether the first or second section of a selected row is to be read.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A photoelectric card reader for sensing rows of punched holes in an opaque card having a plurality of hole positions arranged in rows and columns, comprising: means for holding said card; means for transmitting light to said rows individually; a first plurality of photoelectric cells, a given one of said cells being associated with a given one of said columns; a plurality of opaque shields arranged in pairs, a given pair being associated with a given column to channel light from said column to the photoelectric cell associated with said given column; a second plurality of photoelectric cells, a given one of said cells being associated wth a given columnar hole position in one of said rows; and a plurality of rods of solid light transmitting material, a given one of said rods being positioned between a given one of said second plurality of photoelectric cells and the columnar hole position associated with said given cell to channel a given one of said first plurality of photoelectric cells associated with the column of hole positions which includes the columnar hole position associated with said given one of said second plurality of photoelectric cells.

2. A static photoelectric reader, comprising: means for holding a record medium having rows and columns of light-transmitting areas; and a plurality of light sources, each of which may be selectively energized to illuminate an associated row of light-transmitting areas and at least one of which may be selectively energized in sections to illuminate part of its associated row of light-transmitting areas independently while other rows, and the remaining part of its associated row, are selectively illuminated; a first plurality of baffles arranged in pairs, a given pair being associated with a given light source to channel light to the row of light-transmitting areas associated therewith; a first plurality of photoelectric cells, a given one of said cells being associated with a given one of said columns of light-transmitting areas; a second plurality of baffles arranged in pairs, a given pair being associated with a given column to channel light from an area in said given column transmitting light to an associated photoelectric cell; a second plurality of photoelectric cells, a given one being associated with a given columnar light-transmitting area in said part of said row associated with said light source a section of which may be energized independently; a plurality of light-guiding rods made of solid, light-transmitting material, a given one of said rods luminously connecting a give one of said cells in said second plurality of photoelectric cells to its associated columnar light-transmitting area; and means for independently energizing part of said one light source while selectively energizing the remaining part of said one light source and others of said plurality of light sources; and a plurality of detecting means for detecting the photoelectric effect of light on individual ones of said cells.

3. A static photoelectric reader as defined in claim 2 wherein said plurality of detecting means for detecting the photoelectric effect of light on individual ones of said first plurality of cells are arranged in groups, the combination including means for selectively disabling a given group of said detecting means whereby a section of a selected row may be selectively read.

References Cited in the file of this patent

UNITED STATES PATENTS

| | | |
|---|---|---|
| 1,751,584 | Hansell | Mar. 25, 1930 |
| 2,030,805 | Wiegand | Feb. 11, 1936 |
| 2,251,998 | Goodale | Aug. 12, 1941 |
| 2,294,734 | Bryce | Sept. 1, 1942 |
| 2,413,965 | Goldsmith | Jan. 7, 1947 |
| 2,438,825 | Roth | Mar. 30, 1948 |
| 2,884,852 | Saltz | May 5, 1959 |